United States Patent
Liu et al.

(10) Patent No.: US 7,593,353 B2
(45) Date of Patent: Sep. 22, 2009

(54) METHODS AND APPARATUS FOR CONTENT DELIVERY VIA APPLICATION LEVEL MULTICAST WITH MINIMUM COMMUNICATION DELAY

(75) Inventors: Zhen Liu, Tarrytown, NY (US); Anton Riabov, New York, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 10/800,305

(22) Filed: Mar. 13, 2004

(65) Prior Publication Data

US 2005/0201405 A1    Sep. 15, 2005

(51) Int. Cl.
*H04L 12/28* (2006.01)
(52) U.S. Cl. .................. 370/256; 370/390; 370/432
(58) Field of Classification Search .......... 370/256, 370/390, 432

See application file for complete search history.

(56) References Cited

U.S. PATENT DOCUMENTS

| | | | | |
|---|---|---|---|---|
| 5,619,632 | A * | 4/1997 | Lamping et al. | 345/441 |
| 6,259,988 | B1 * | 7/2001 | Galkowski et al. | 701/202 |
| 6,668,226 | B2 * | 12/2003 | Sutanto | 701/208 |
| 7,020,076 | B1 * | 3/2006 | Alkalai et al. | 370/217 |
| 2001/0034793 | A1 * | 10/2001 | Madruga et al. | 709/238 |
| 2005/0111386 | A1 * | 5/2005 | Jain et al. | 370/256 |

OTHER PUBLICATIONS

Akamai Corporation. Internet Bottlenecks: The Case for Edge Delivery Services, 2000. Akamai whitepaper.

S. Arora. "Polynomial-time Approximation Schemes for Euclidean TSP and other Geometric Problems", Journal of the ACM 45(5) 753-782, 1998.

S. Banerjee, B. Bhattacharjee and C. Kommareddy, Scalable Application Layer Multicast, in Proceedings of ACM Sigcomm 2002.

Y. Chawathe, S. McCanne, and E. A. Brewer, RMX: Reliable Multicast for Heterogeneous Networks, in Proceedings of IEEE Infocom, 2000.

Y. Chu, S. Rao, S. Seshan, and H. Zhang. Enabling Conferencing Applications on the Internet Using an Overlay Multicast Architecture. Aug. 2001.

Y. Chu, S. Rao, and H. Zhang, "A case for end system multicast," in Proceedings of ACM Sigmetrics, Jun. 2000.

C. Diot, B. Levine, B. Lyles, H. Kassem, and D. Balensiefen. Deployment Issues for the IP Multicast Service and Architecture. IEEE Network Magazine, Jan./Feb. 2000.

P. Francis, Yoid: Extending the Internet Multicast Architecture, http://www.icir.org/yoid/docs/yoidArch.ps.gz (Apr. 2000).

(Continued)

*Primary Examiner*—Jason E Mattis
(74) *Attorney, Agent, or Firm*—George Willinghan; August Law, LLC

(57) ABSTRACT

A method for constructing an overlay multicast tree to deliver data from a source to an identified group of nodes is provided in which a plurality of nodes are identified and mapped into multidimensional Euclidean space. A geometric region is constructing having a size that is the minimum size necessary to contain the source and all the nodes. Once constructed, a tree is created beginning at the source and including all of the nodes within the geometric region.

20 Claims, 14 Drawing Sheets

OTHER PUBLICATIONS

J. Jannotti, D. Gifford, K. Johnson, M. Kaashoek, and J. O'Toole, Overcast: Reliable Multicasting with an Overlay Network, Oct. 2000.

J. Liebeherr and M. Nahas. "Application-layer Multicast with Delaunay Triangulations", Global Internet Symposium, IEEE Globecom 2001, Nov. 2001.

N. M. Malouch, Z. Liu, D. Rubenstein and S. Sahu. "A Graph Theoretic Approach to Bounding Delay in Proxy-Assisted, End-System Multicast", (IWQoS 2002).

T. S. E. Ng and H. Zhang, "Predicting Internet Network Distance with Coordinates-Based Approaches", INFOCOM'02, New York, NY, Jun. 2002.

D. Pendarakis, S. Shi, D. Verma and M. Waldvogel, "ALMI: An Application Level Multicast Infrastructure", (USITS), Mar. 2001.

S. Ratnasamy, P. Francis, M. Handley, R. Karp, and S. Shenker, A scalable content-addressable network in Proceedings of ACM SIGCOMM (Aug. 2001).

S. Shi. "Design of Overlay Networks for Internet Multicast". Ph.D. Thesis, Washington University in St. Louis, Aug. 2002.

S. Shi, J. S. Turner. "Routing in Overlay Multicast Networks", IEEE INFOCOM, New York City, Jun. 2002.

S. Shi, J. S. Turner and M. Waldvogel. "Dimensioning Server Access Bandwidth and Multicast Routing in Overlay Networks", (NOSSDAV 2001), Port Jefferson, New York, Jun. 2001.

I. Stoica, R. Morris, D. Karger, M. F. Kaashoek, and H. Balakrishnan. Chord: A scalable peer-to-peer lookup service for Internet applications, 2001.

Z. Wang and J. Crowcroft. Bandwidth-delay Based Routing Algorithms. In IEEE Globecom'95, Nov. 1995.

B. Zhang, S. Jamin, L. Zhang, Host Multicast: A Framework for Delivering Multicast To End Users, in Proceedings of IEEE Infocom (2002).

J. Liebeherr and M. Nahas. "Application-layer Multicast with Delaunay Triangulation Overlays".

* cited by examiner

METHODS AND APPARATUS FOR CONTENT DELIVERY VIA APPLICATION LEVEL MULTICAST WITH MINIMUM COMMUNICATION DELAY

FIELD OF THE INVENTION

The present invention is directed to methods and apparatus for content delivery via application level multicast with minimum communication delay.

BACKGROUND OF THE INVENTION

In many applications, such as Internet-based content distribution networks, a desirable means of delivering information is multicast, which is delivering information simultaneously to a chosen group of hosts. Currently a set of standards exists to support multicast in internet protocol ("IP") networks. However, overlay (or application-layer) multicast has become an increasingly popular alternative to network-supported IP multicast. While IP multicast is not universally available on the Internet, and requires the allocation of a globally unique IP address for each communicating group, overlay multicast can be easily implemented over existing infrastructure, and no global group identifier is required.

At a high level of abstraction, an overlay network can be described as a directed communication graph where the nodes are the end-systems and an edge between any two nodes represents the path between those two nodes. While this path may actually traverse several routers in the physical network, at this level of abstraction the path is considered as a direct link in the overlay network.

The nodes can be connected through various shapes or topologies, for example, a tree topology. The end systems participate explicitly in forwarding data to other nodes in a store-and-forward way. After receiving data from its parent node in the overlay network, a node will replicate the data on each of its outgoing links and forward it to each of its downstream nodes in the overlay network.

In one example of multicast, a dedicated source host delivers information to a group of receiving hosts. Overlay multicast is implemented in the application layer, and all the data are transmitted using unicast delivery supported in the underlying network. Because of bandwidth limitations, sending data directly from the source simultaneously to each one of the receiving hosts using unicast may be impossible. Therefore, overlay multicast uses receiving hosts to forward information to subsequent receiving hosts. For a given data stream intensity, each receiving host has a fixed bound on the number of subsequent receiving hosts to which it can communicate. These data stream intensities or bandwidth capacity constraints are expressed as out-degree constraints on each one of the nodes or hosts in the multicast tree.

An important practical problem is to determine how to construct a multicast tree that minimizes the largest communication delay observed by the receiving hosts during a multicast. Various studies have been conducted focusing on protocol development for efficient overlay tree construction and maintenance. Examples of these studies include Y. Chu, S. Rao, and H. Zhang, "A Case for End System Multicast," in Proceedings of ACM Sigmetrics, June 2000, P. Francis, *Yoid: Extending the Internet Multicast Architecture*, http://www.icir.org/yoid/docs/yoidArch.ps.gz (April 2000), D. Pendarakis, S. Shi, D. Verma and M. Waldvogel, "ALMI: An Application Level Multicast Infrastructure", in 3rd Usenix Symposium on Internet Technologies systems (USITS), March 2001., B. Zhang, S. Jamin, L. Zhang, *Host Multicast: A Framework for Delivering Multicast To End Users*, in Proceedings of IEEE Infocom (2002), S. Banerjee, B. Bhattacharjee and C. Kommareddy, *Scalable Application Layer Multicast*, in Proceedings of ACM Sigcomm 2002, and J. Liebeherr and M. Nahas. "Application-layer Multicast with Delaunay Triangulations", Global Internet Symposium, IEEE Globecom 2001, November 2001.

Additional examples in peer-to-peer networks relate to tree construction in application level multicast, for example, I. Stoica, R. Morris, D. Karger, M. F. Kaashoek, and H. Balakrishnan, *Chord: A Scalable Peer-To-Peer Lookup Service For Internet Applications*, in Proceedings of the 2001 conference on applications, technologies, architectures, and protocols for computer communications, 2001, pp. 149-160, San Diego, Calif., United States, and S. Ratnasamy, P. Francis, M. Handley, R. Karp, and S. Shenker, *A Scalable Content-Addressable Network*, Proceedings of ACM SIGCOMM (August 2001).

In Y. Chu, S. Rao, S. Seshan, and H. Zhang, "Enabling Conferencing Applications on the Internet Using an Overlay Multicast Architecture", in Proceedings of ACM SIGCOMM'01, San Diego, Calif., August 2001, a heuristic called Bandwidth-Latency is used to build the multicast overlay tree. This heuristic, which is described in greater detail in Z. Wang and J. Crowcroft, "Bandwidth-delay Based Routing Algorithms", in IEEE Globecom'95, November 1995, selects paths by choosing those with the greatest available bandwidth (i.e., maximum possible fan-out).

Other approaches to tree construction attempt to construct a rooted spanning tree having a minimum radius using degree constraints. The well known Traveling Salesman Problem ("TSP"), as described for example in S. Arora. "Polynomial-time Approximation Schemes for Euclidean TSP and other Geometric Problems", Journal of the ACM 45(5) 753-782, 1998, is one special case. In general, however, the degree-constrained spanning tree problem is harder than the TSP. In S. Shi, J. S. Turner and M. Waldvogel. "Dimensioning Server Access Bandwidth and Multicast Routing in Overlay Networks", The 11th International Workshop on Network and Operating Systems Support for Digital Audio and Video (NOSSDAV 2001), Port Jefferson, New York, June, 2001, S. Shi, J. S. Turner, "Routing in Overlay Multicast Networks", IEEE INFOCOM, New York City, June 2002 and S. Shi. "Design of Overlay Networks for Internet Multicast". Ph.D. Thesis, Washington University in St. Louis, August 2002, an NP-hard, minimum diameter, degree-limited spanning tree problem (MDDL) is described, and heuristics for solving the problem are proposed. In the minimum-diameter version considered, the objective is to minimize the largest communication delay between any pair of participating nodes. However, the quality of the heuristic solution observed in the described simulations decreases as the number of nodes increases.

In N. M. Malouch, Z. Liu, D. Rubenstein and S. Sahu. "A Graph Theoretic Approach to Bounding Delay in Proxy-Assisted, End-System Multicast", Tenth International Workshop on Quality of Service (IWQoS 2002), a radius minimization version is presented, where the distance to the root is minimized. The authors prove that the problem in general is NP-hard and show that in the special case of unit node-to-node delays the problem can be solved optimally in polynomial time. For the case of general distances, a set of heuristics is described. For all the proposed heuristics, the scalability issue remains open. In particular, the worst-case delay bound proven for these algorithms may grow quickly as the size of the system increases.

Therefore, a communication configuration and content delivery scheme are still needed for routing and forwarding data from a source to a selected group of recipients that minimizes the minimum delay from the source to all the clients. The configuration would used an overlay multicast network and would still achieve minimal broadcast delays as the size of the system grows.

SUMMARY OF THE INVENTION

The present invention is directed to methods and apparatus for providing the best communication configurations for network content delivery using application level multicast in overlay networks. Methods in accordance with the present invention construct a degree-constrained spanning tree in a complete graph, where the nodes correspond to the hosts or group members, and the edges correspond to unicast communication paths.

Each node can be mapped to a point in space, for example Euclidean and non-Euclidean space and node-to-node delays can be approximated by distances between these points in that space. Preferably, each node is mapped to a point in Euclidean space. An algorithm is used to construct a degree-constrained spanning tree in this Euclidean space that arrives at an asymptotically optimal solution. The asymptotic optimality result holds if points are uniformly distributed inside a convex region in Euclidean space, and at least 2 outgoing links are allowed at each node. In addition, the asymptotic optimality result extends to a non-uniform distribution case when the density function is more than some constant, $\epsilon > 0$, inside the convex region, and zero everywhere else.

In one embodiment in accordance with the present invention, a method is provided for constructing an overlay multicast tree to deliver data from a source to an identified group of nodes which have been identified and mapped into multidimensional Euclidean space. A geometric region is constructed having a size that is the minimum size necessary to contain the source and all the nodes. Once constructed, a tree is created within this geometric region beginning at the source and including all of the nodes within the identified group.

DETAILED DESCRIPTION

Figure 1:
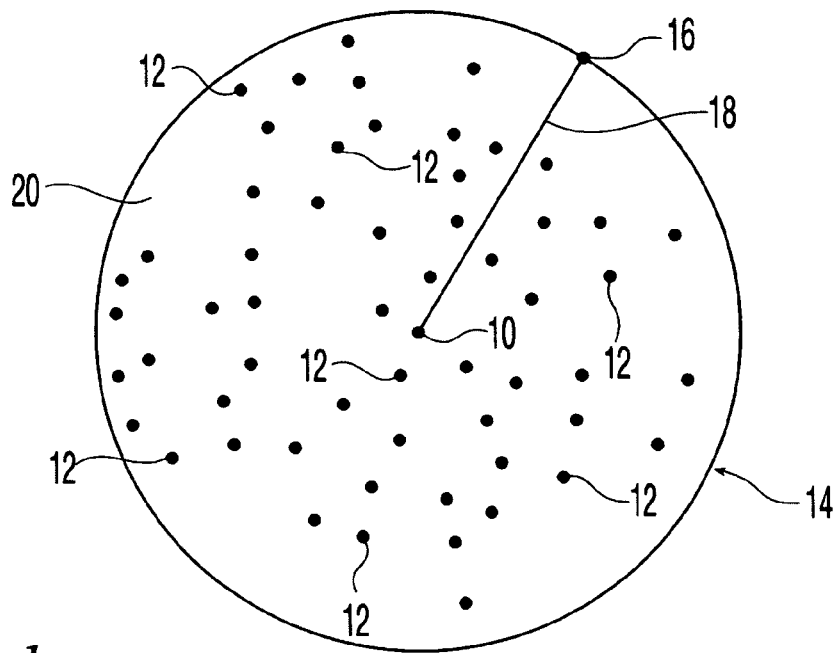
FIG. 1 is a schematic representation of a geometric region containing a representation of a plurality of nodes in Euclidian space.

Referring initially to FIGS. 1-5, the present invention is directed to a method for constructing an overlay multicast tree to deliver data from a source 10 to an identified group containing a plurality of nodes 12. The delivered data include audio, video and text communications among others. These data can be contained in services such as on-demand movies, pay-per-view events, Internet radio broadcasts, multi-user network based games and video conferences. The source 10 is the provider or host of the service provided and includes the software and hardware necessary to delivery that service. The nodes 12 are generally members or subscribers in a network such as a wide area network (Internet or World Wide Web) or a local area network. Although all the subscribers in a given network can be included in a given group of nodes 12, typically the identified group includes only those nodes 12 that have access to a particular service. Each node 12 within the identified group has the ability to both receive data and to re-transmit that data to one or more subsequent nodes. Suitable arrangements of sources and nodes are known and available in the art.

Initially, the nodes 12 that are contained within a given group are identified. In identifying the nodes 12, various information about each node 12 is determined, including geographical location, domain, internet protocol ("IP") address and associated network delays. Once identified, the nodes 12 are mapped into multidimensional space, including Euclidean and non-Euclidean space. Preferably, the nodes 12 are mapped to Euclidean space. Various methods for mapping the nodes 12 into Euclidean space are known and available in the art. For example, S. Shi, J. S. Turner. "Routing in Overlay Multicast Networks", IEEE INFOCOM, New York City, June 2002, T. S. E. Ng and H. Zhang, "Predicting Internet Network Distance with Coordinates-Based Approaches", INFOCOM'02, New York, N.Y., June 2002 and J. Liebeherr and M. Nahas, "Application-layer Multicast with Delaunay Triangulations", Global Internet Symposium, IEEE Globecom 2001, November 2001, which are both incorporated herein by reference in their entireties, use geographical locations of computers to create a mapping of hosts to a two-dimensional plane. The advantage of these methods is that no actual network delays need to be measured to construct the mapping, and subsequently the multicast tree.

Other methods for mapping the nodes or hosts 12 to points in Euclidean space represent network delays as corresponding Euclidean distances. Such an approach proposed in work by the Global Network Positioning group and described in T. S. E. Ng and H. Zhang, "Predicting Internet Network Distance with Coordinates-Based Approaches", INFOCOM'02, New York, N.Y., June 2002, which is incorporated herein by reference in its entirety, achieves higher accuracy by measuring some of the delays, and mapping hosts into Euclidean spaces of dimension 3 and above.

Once the nodes 12 of the identified group have been mapped to the Euclidean space, a geometric region 14 is constructed in the Euclidean space having a size that is the minimum size necessary to contain both the source and all the nodes. Therefore, the geometric region 14 could not be made any smaller without excluding at least one of the nodes 12. Suitable shapes for the geometric region 14 in 2-dimensional space include circles, ellipses, rectangles, squares, triangles and combinations thereof. As illustrated in FIGS. 1-5, the geometric region 14 is a circle. In one embodiment, the circular geometric region 14 is constructed by identifying a node 16 from the plurality of nodes 12 that is spaced the farthest distance from the source 10 in Euclidean space. Then a circle is drawn centered on the source 10 and having a radius 18 equal to the distance between the source 10 and the farthest node 16.

After the geometric region 14 has been drawn, a grid is created within the geometric region. In one embodiment, a three stage grid partitioning algorithm is used to iteratively create a grid containing a plurality of cells 20 (FIG. 5) such that all of the cells 20 have substantially equivalent areas. Overall, for a circular or polar grid, the three stages of the grid partitioning algorithm include creating a grid of equal area cells to partition the disk, connecting the cells, using cell representative nodes to form a core network and connecting any additional nodes or points within each one of the cells, using, for example as constant factor approximation algorithm.

FIGS. 1-4 illustrate the first few iterations of one embodiment of constructing the polar grid. In general, all cells in the grid have the same area. In addition, the cells are organized or arranged in successive, concentric rings, each ring containing twice as many cells as the ring immediately inside it. Also, there is at least one node 12 in each cell 20 of the grid, with the exception of the cells 20 in the outermost ring 22. As shown in FIG. 1, the circular geometric region 14 has been drawn having a radius 18 equal to the distance between the source 10 and the farthest node 16 and containing all of the nodes 12 within the identified group. In this initial state, the geometric region 14 contains a single cell 20.

Figure 2:
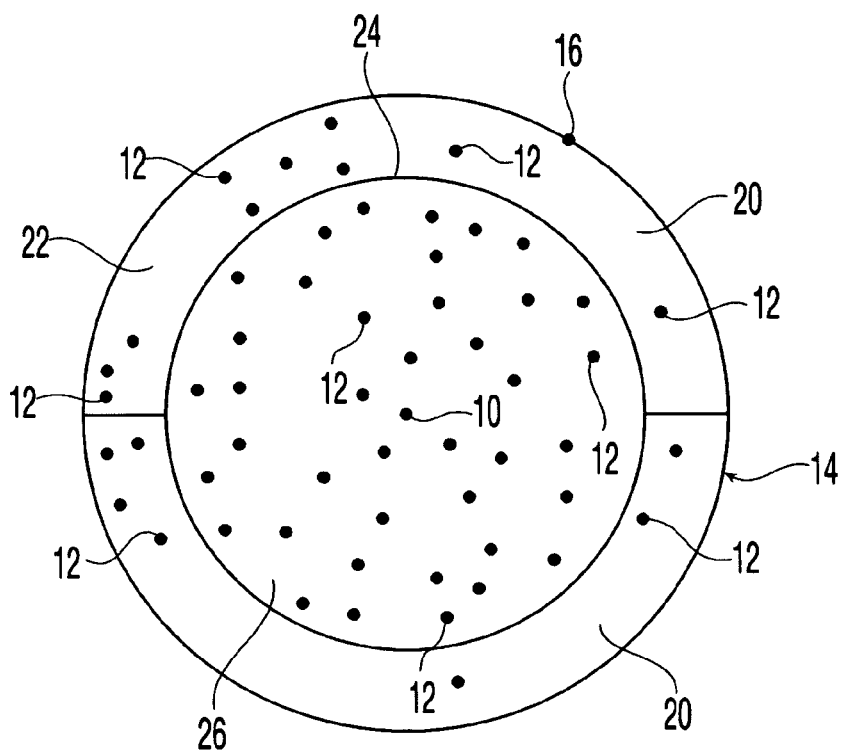
FIG. 2 is the schematic presentation of FIG. 1 in a first subdivided arrangement.

The geometric region 14 is then divided into the plurality of rings by drawing a sequence of circles of decreasing radius concentric with the source 10. As shown in FIG. 2, a first such inner circle 24 is drawn creating the outer most ring 22 and a single central cell 26. The central cell 26 is preferably always a single cell, and since the number of cells doubles with each ring as you move radially away from the source 10, the outermost ring is divided into two cells 20 such that both of the cells 20 and the central cell 26 have substantially the same area. As is described in more detail below, in one embodiment the radius of each ring is selected to achieve cells having substantially the same area. For example, the location of the first inner circle 24 is selected to bisect the original area of the geometric region 14. Therefore, the desired properties for the grid are maintained.

Figure 3:
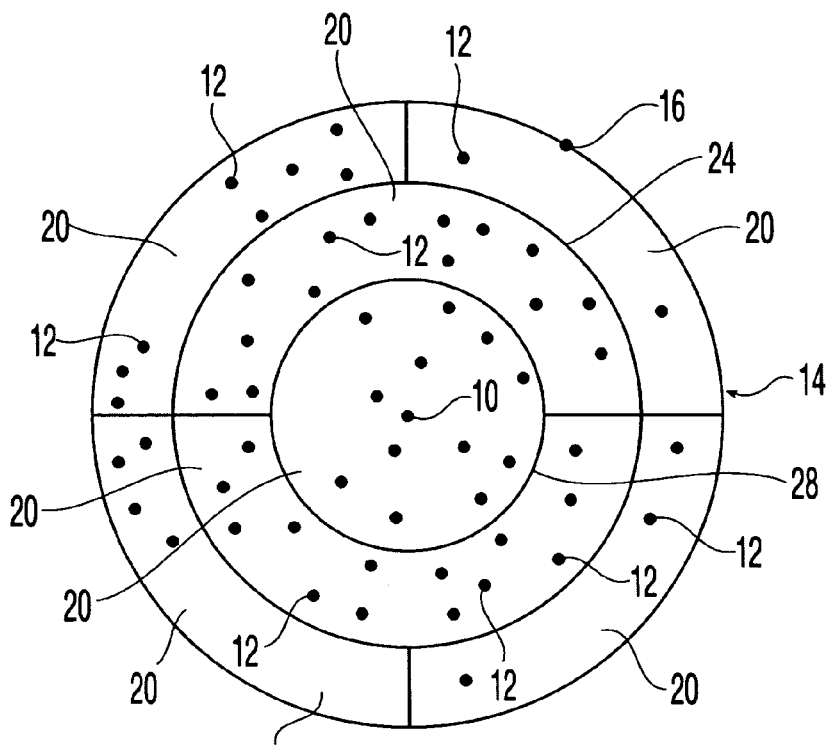
FIG. 3 is the schematic presentation of FIG. 1 in a second subdivided arrangement.
Figure 4:
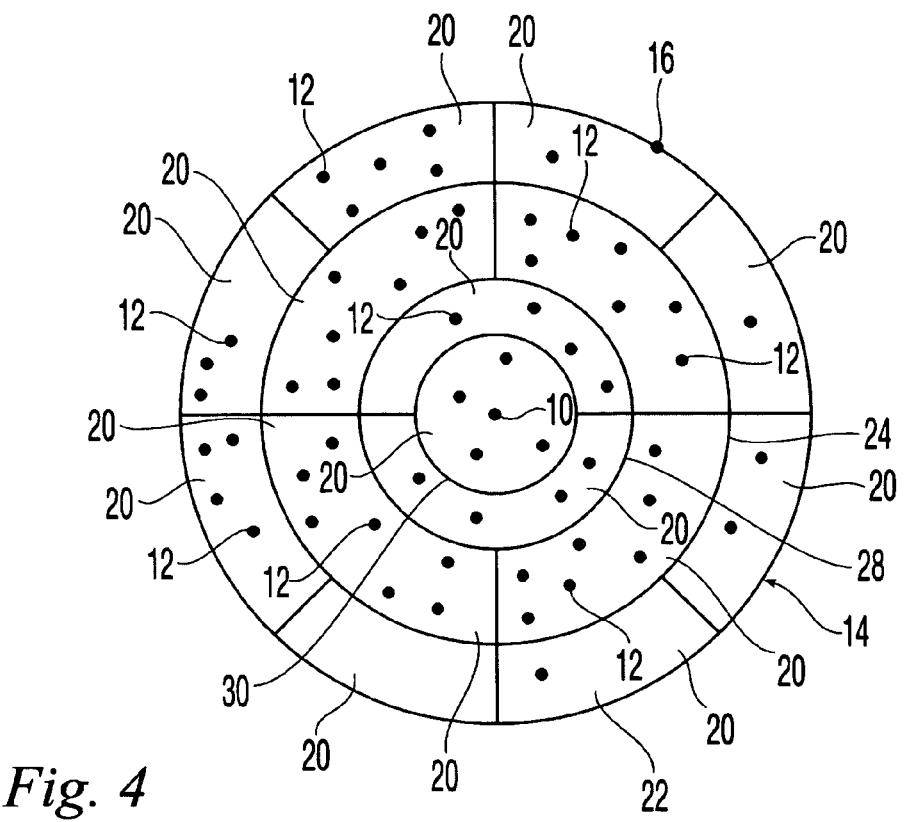
FIG. 4 is the schematic presentation of FIG. 1 in a third subdivided arrangement.

As shown in FIG. 3, a second inner circle 28 concentric with the first inner circle 24 is drawn. The second inner circle 28 is drawn to bisect the area inside the first inner circle 24. The ring created is subdivided into two cells and the outermost ring 22 is subdivided again to form a total of four cells. Again, all cells contain the same area, and the cells are arranged so that each inner cell is aligned with two cells in the next ring. As shown in FIG. 4, a third inner circle 30 is drawn so as to divide the area enclosed by the second inner circle 28 in half. The rings are then subdivided into cells 20, and the cells 20 are aligned as before. This process of drawing circles, forming rings and subdividing rings into cells continues iteratively until one or more of the properties for the grid are violated. In one embodiment, the process continues until the next iteration will create at least one cell not located in the outermost ring 22 that does not contain at least one node 12.

Figure 5:
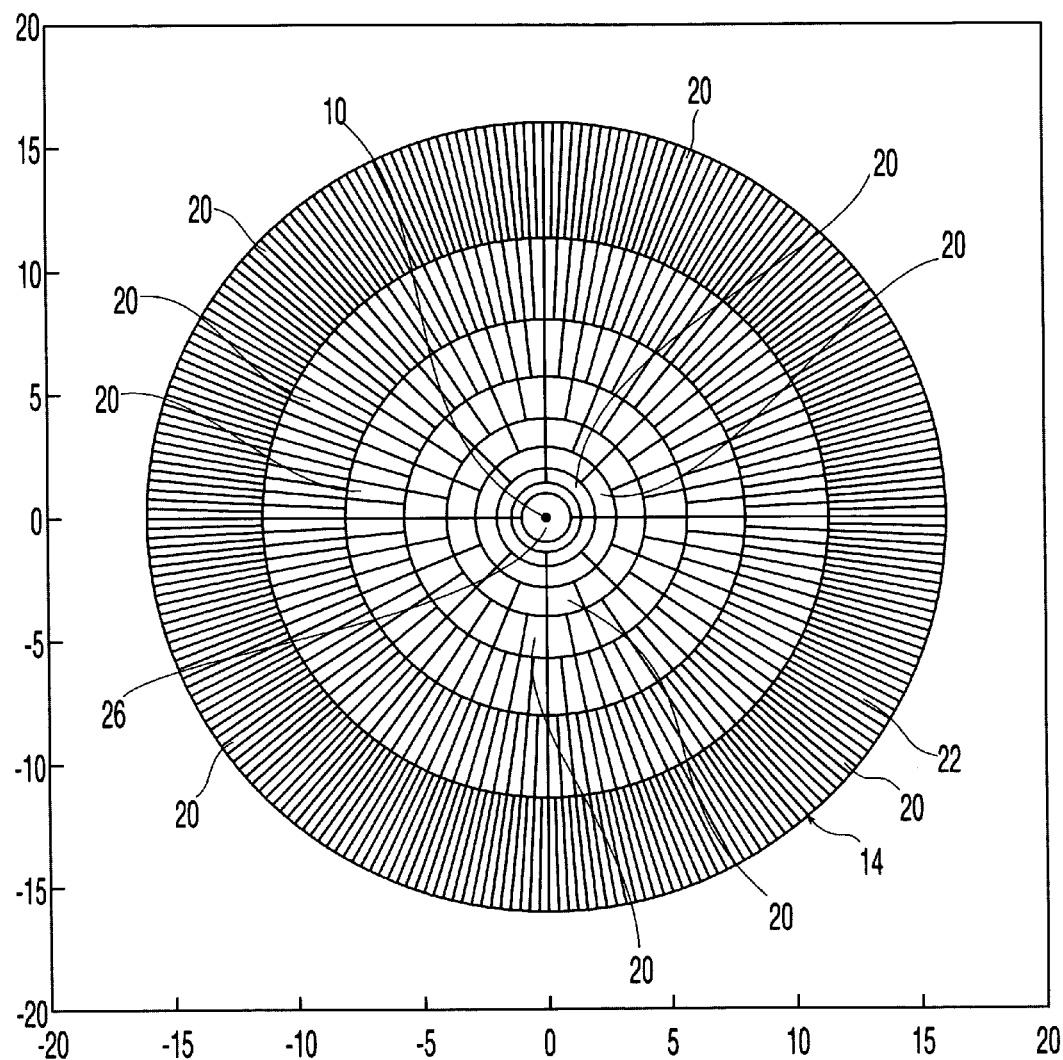
FIG. 5 is a representation of a polar geometric region subdivided by an internal grid.

FIG. 5 illustrates a polar grid containing eights concentric rings 20 and the single central cell 26 in accordance with the present invention. In general, for a fixed number of rings 20, call it k, the grid is constructed by dividing the geometric region 14 with an overall radius M using k circles with the same center and each having a radius $r_i = M/(\sqrt{2})^{k-i}$, where $0 \leq i \leq k-1$. For purposes of simplicity and without loss of generality that the geometric region 14 is a unit disk, i.e. M=1, and each k circle will have a radius $r_i = 1/(\sqrt{2})^{k-i}$. Each ring 20, identified as i, is divided into $2^i$ equal segments such that each cell segment on level i is aligned with 2 segments on level i+1.

Since the radius of ring i is chosen such that $r_i = (\sqrt{2})r_{i-1}$, the area of the disk bounded by circle i is twice the area of the disk bounded by the circle (i−1). For example, if there are two cells inside circle 0, then it is easy to see that for each i, circle i contains twice as many cells as circle (i−1), preserving the properties of the grid. For a given set of nodes 12, the number of rings, k, is chosen as large as possible such that there is at least one point in each cell of the grid except for the cells in the outermost ring 22. In general, k increases as the number of nodes 12 increases.

Figure 6:
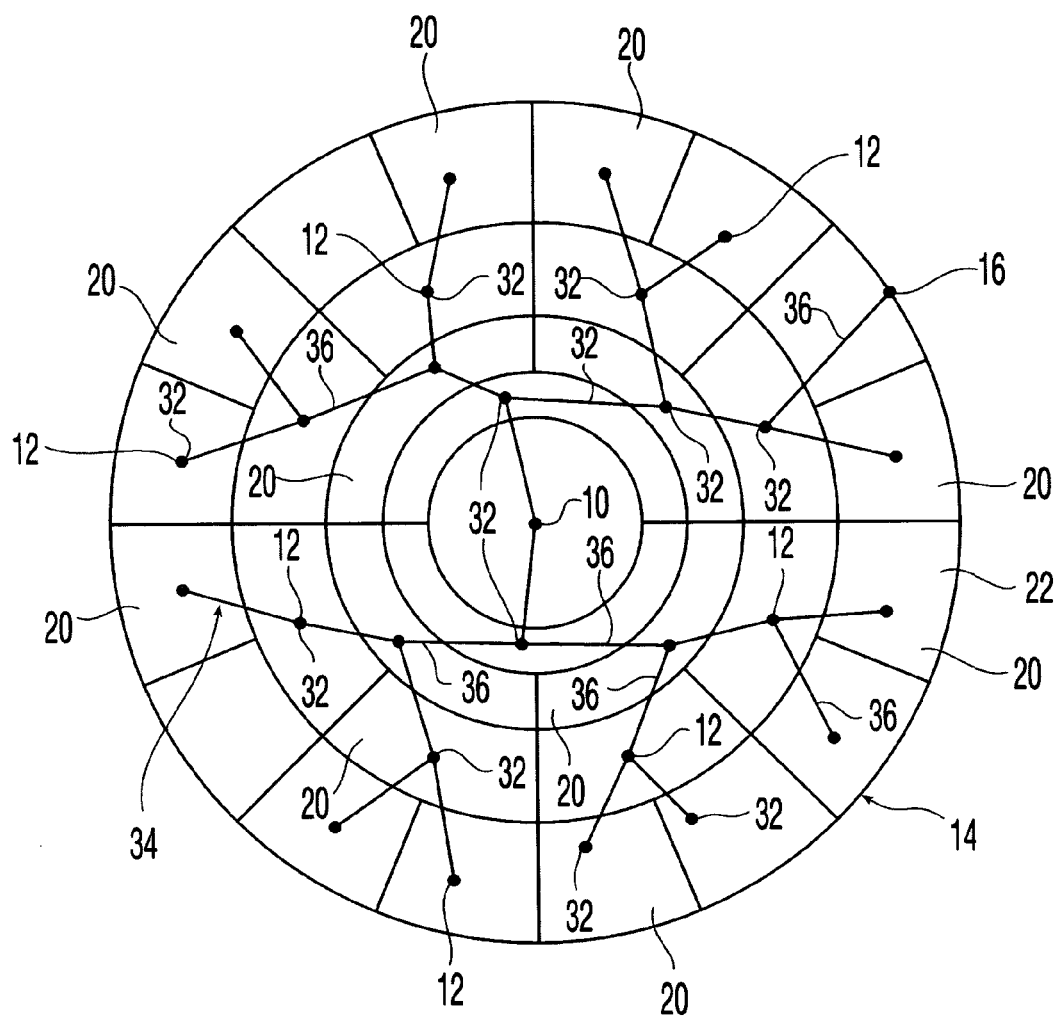
FIG. 6 is a schematic representation of a binary tree structure connecting a plurality of nodes within a geometric region.
Figure 7:
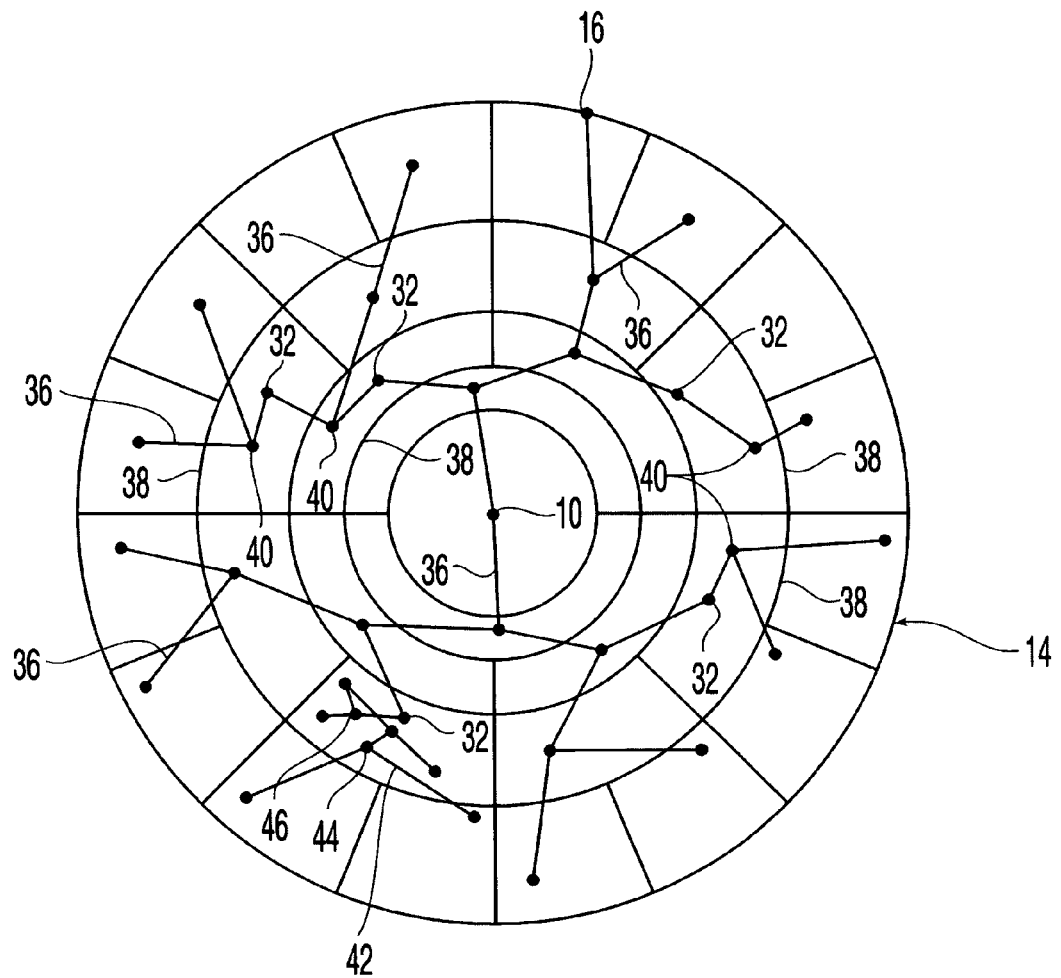
FIG. 7 is a schematic representation of another tree structure connecting a plurality of nodes within a geometric region.

Referring to FIGS. 6 and 7, once the grid has been established within the geometric space, the cells 20 are connected by creating a tree beginning at the source 10 and including all of the nodes 12 within the geometric region 14. Since each ring segment contains at least one node, with the exception of the outermost ring segment, a representative node 32 can be identified for each cell containing at least one node 12. The representative node 32 is the first node 12 within a given cell 20 to be connected to the tree. For cells 20 containing more than one node, the representative node 32 is selected to be the node within each cell that is closest to the source.

An algorithm is used to connect the nodes 12, including the representative nodes 32 and the remaining nodes 12, based upon the number of nodes in a given cell 20. The number of nodes 12 in each cell 20 can vary from cell to cell in a given grid or can be uniform among the cells 20. In the case of cells 20 having a single node 12, that node is the representative node 32 and is used to connect to the representative nodes 32 in each of two cells 20 in the next ring. As illustrated in FIG. 6 for the case of each cell 20 having exactly one node 12, a binary tree 34 can be constructed connecting each node 12. The nodes 12 represent the leaves in the tree 34 and the connections between the nodes are the edges 36.

As illustrated in FIG. 7, for cells 38 that contain two nodes 12, the representative node 32 is selected to be the node 12 that is closest to the source 10. The representative node 32 is connected to the tree first. The representative node 32 is then connected to the second node 40 in the cell 20 which is then used to connect to the representative node in each one of the two cells in the next ring. For cells 42 containing three or more nodes 12, the representative node 32 is selected to be the node closest to the source 10 and is connected to the tree first. Then a second node closest to the center of the cell 44 is selected. This second node 44 is connected to the representative node 32 and is used to connect to the representative nodes 32 in each one of the two cells in the next ring. A third node 46 is then selected, for example arbitrarily, and used to connect to the remaining nodes within the cell 42.

Various methods can be used to connect the remaining nodes within the cell 42. In one embodiment, the constant factor approximation algorithm is used to connect the remaining nodes 12 to complete the distribution tree. In one embodiment, the constant factor algorithm utilizes out-degree 4, and an additional out-degree 2 can be used at the representative node to connect to next level cells. The resulting spanning tree will have maximum out-degree 6. Each node 12 can be provided with the necessary out-degree to accommodate the number of nodes to which it communicates. Alternatively, the number of out-degrees can be fixed or minimized. In one embodiment, the out-degree is less than ten for each node in the tree. In another embodiment, the out-degree is less than two for each node in the tree.

The constant factor approximation algorithm creates a valid degree-constrained spanning tree for a given set of points in Euclidean space. The length of the longest path in the tree is within a constant factor of the best solution among all the possible degree-constrained spanning trees. This constant approximation factor is independent of the number of points in the region. Although it is easier to describe a version of the algorithm for a square, a polar version is used herein.

Figure 8:
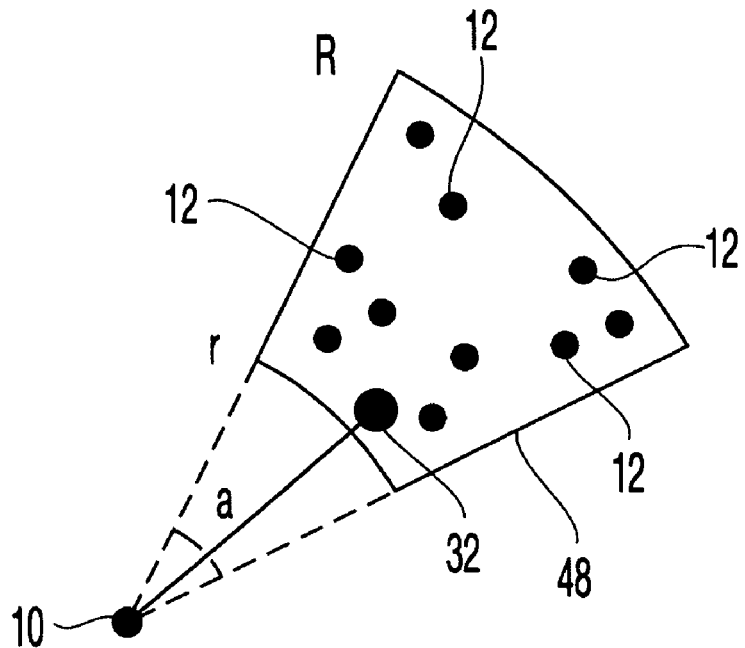
FIG. 8 is a first schematic representation of a ring segment.
Figure 9:
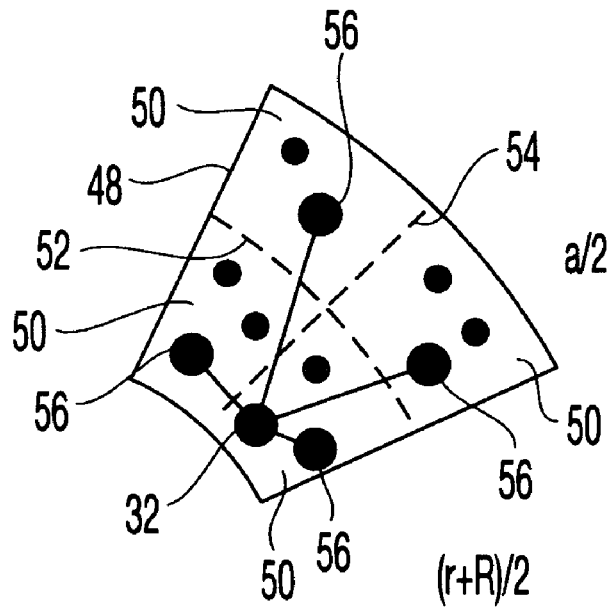
FIG. 9 is a second schematic representation of the ring segment showing the connection among nodes in accordance with the present invention.

Referring to the ring cell or segment 48 illustrated in FIG. 8, the ring segment 48 has an inner radius r, an outer radius R and angle a. Ring segment 48 contains a plurality of nodes 12 and the source 10 is specified which is connected either directly or indirectly to the representative node 32 for that ring segment 48. The constant factor algorithm proceeds recursively as follows. As shown in FIG. 9, ring segment 48 is divided into 4 sub-segments 50, by splitting the ring segment 48 using an arc 52 of radius (R+r)/2 and a ray 54 dividing angle a into two halves. A sub-segment representative node 32 is selected in each non-empty sub-segment 50 such that the radius associated with each one of these representative nodes 56 in polar coordinates is closest to the radius of the original representative node 32. The original representative node 32 is then connected to each one of the sub-segment representative nodes 56. This procedure is continuously repeated within each non-empty sub-segment 50 to connect all the nodes inside the ring segment 48 to the tree.

The constant factor approximation algorithm constructs a spanning tree in which each node has at most 4 children. Each path that is constructed through the tree moves monotonically along the radius axis. The steps along the angle axis at each level can be bounded by the angle of each sub-segment. Therefore, the length of each path $l_p$ can be bounded from above using the triangle inequality as follows:

$$l_p \leq \max(R-q, q-r) + Ra + Ra/2 + Ra/4 + \ldots \leq \max(R-q, q-r) + 2Ra,$$

where q is the radius of the representative or source node.

As is shown below, this algorithm can be used to construct a constant factor approximation for a given set of nodes 12. As discussed above, a ring segment is constructed to encompass all the nodes. By picking the source 10 to be very far from the ring segment, angle a is small, (sin a>(⅚)a), and both R and r are large, such that r>0.6R. R and r are picked such that R-r can not be reduced without leaving some nodes out of the ring segment. Similarly, assume that a can not be reduced. Since any path must connect to extreme nodes and using triangle inequality, for the optimal longest path ("OPT"), the following equation holds:

$$OPT \geq \max(R-q, q-r),$$

$$OPT \geq r \sin a > (½)Ra.$$

Combining this with $l_p \leq \max(R-q, q-r) + 2Ra$, for any tree path p, produces the follow result that $l_p \leq 5 \times OPT$. Therefore this algorithm can be used to produce solutions within a constant factor of the best possible solution.

The algorithm can be modified to produce a spanning tree with out-degree 2. To do this, during each recursive call, the source or representative node is connected to two nodes in the same segment. Nodes are preferably chosen to have a radius closest to the radius of the source. Then each of the two nodes can be used to connect 2 of the 4 sub-segments, so that all sub-segments are connected. In this embodiment, the upper bound on the solution doubles the angle term, since on each level of the path 2 links are used instead of one:

$$l_p \leq \max(R-q, q-r) + 4Ra$$

This result can be stated by the following theorem. The constant factor approximation algorithm provides a solution within a factor of 5 times optimal for the minimum radius problem when maximum out-degree is restricted to be 4. The approximation factor becomes 9 if the maximum out-degree is restricted to be 2.

The present invention produces multicast overlay network trees that are asymptotically optimal. In general, the algorithm divides the disk or geometric region into a hierarchy of smaller and smaller grid cells. The algorithm builds a tree based on the hierarchy to connect the points in the grid cells. In order to prove asymptotic optimality, k is shown to increase as a function of the number of nodes n. For purposes of this proof, the n points corresponding to the communicating nodes are uniformly distributed inside a disk of radius 1, and the source is located at the center of the disk. In addition, each node can forward transmissions to at least 6 down-stream nodes.

For purposes of proving asymptotic optimality, the following two lemmas are introduced.

Lemma 1: If each of n balls is uniformly and independently assigned to one of $n^\alpha$ buckets (for some fixed $\alpha$), the probability $p_\alpha(n)$ of having at least one empty bucket after the assignment is complete satisfies:

$$p_\alpha(n) \leq n^\alpha e^{-n^{(1-\alpha)}}$$

Proof: The probability of having at least one bucket empty is bounded from above by the sum of probabilities of having each of the buckets empty. Therefore, $$p_\alpha(n) \leq n^\alpha (1-(1/n^\alpha))^n$$

By noting that $1-x \leq e^{-x}$ for any x, the inequality $p_\alpha(n) \leq n^\alpha e^{-n^{(1-\alpha)}}$ follows.

The following corollary follows immediately.

Corollary 1: If $\alpha < 1$, then $p_\alpha(n) \to 0$ as $n \to \infty$.

Corollary 1 would suffice to derive an asymptotic result for the analysis. However, to determine the values of a that can give useful results even for small n, the following lemma gives some insight.

Lemma 2: If $a \leq ½$, then $p_\alpha(n) \leq e^{-1}$ for all $n \geq 1$.

Proof: Consider $f_\alpha(x) = x^\alpha e^{-x^{(1-\alpha)}}$. Assuming that $0 < \alpha < 1$ and $x \geq 0$, $f_\alpha(x)$ is a concave function of x. By taking the derivative, it can be shown that the function reaches a maximum at $x_\alpha^* = (\alpha/(1-\alpha))^{1/(1-\alpha)}$. By noticing that $x_\alpha^*$ is increasing in $\alpha$ and $x_{1/2}^* = 1$, for $\alpha \leq ½$, the maximum is attained at some $x_\alpha^* \leq 1$, and hence for $x \geq 1$, function $f_\alpha(x)$ is non-increasing. Furthermore, for any $\alpha$, $f_\alpha(1) = e^{-1}$. The lemma follows from $p_\alpha(n) \leq f_\alpha(n)$.

Therefore, since in k-ring grid there are $2^{k+1}$ cells, with high probability we can say that if we require at least one point in each cell, then $\sqrt{n} \leq 2^{k+1}$, and therefore, $k \geq ½ \log_2 n$. In the analysis it is assumed that n is sufficiently large and $k \geq 1$.

The solution quality can now be evaluated based on the uniform distribution assumptions. It is easy to see that, as the number of nodes n increases, the lower bound of the optimal solution cost (the longest distance from disk center to any node) approaches 1 from below. To complete the proof, it needs to be shown that an upper bound on the solution obtained by the algorithm approaches 1 from above.

Any path P in the constructed spanning tree contains two parts: the sub-path p connecting cell representatives, and the sub-path q between the points in the last cell, constructed by the constant factor approximation algorithm $l_P = l_p + l_q$. Making use of $l_p \leq \max(R-q, q-r) + 2Ra$, yields $l_q \leq \max(R-q, q-r) + 2Ra$, for some R,r,a and q defined by the past cell path P.

Figure 10:
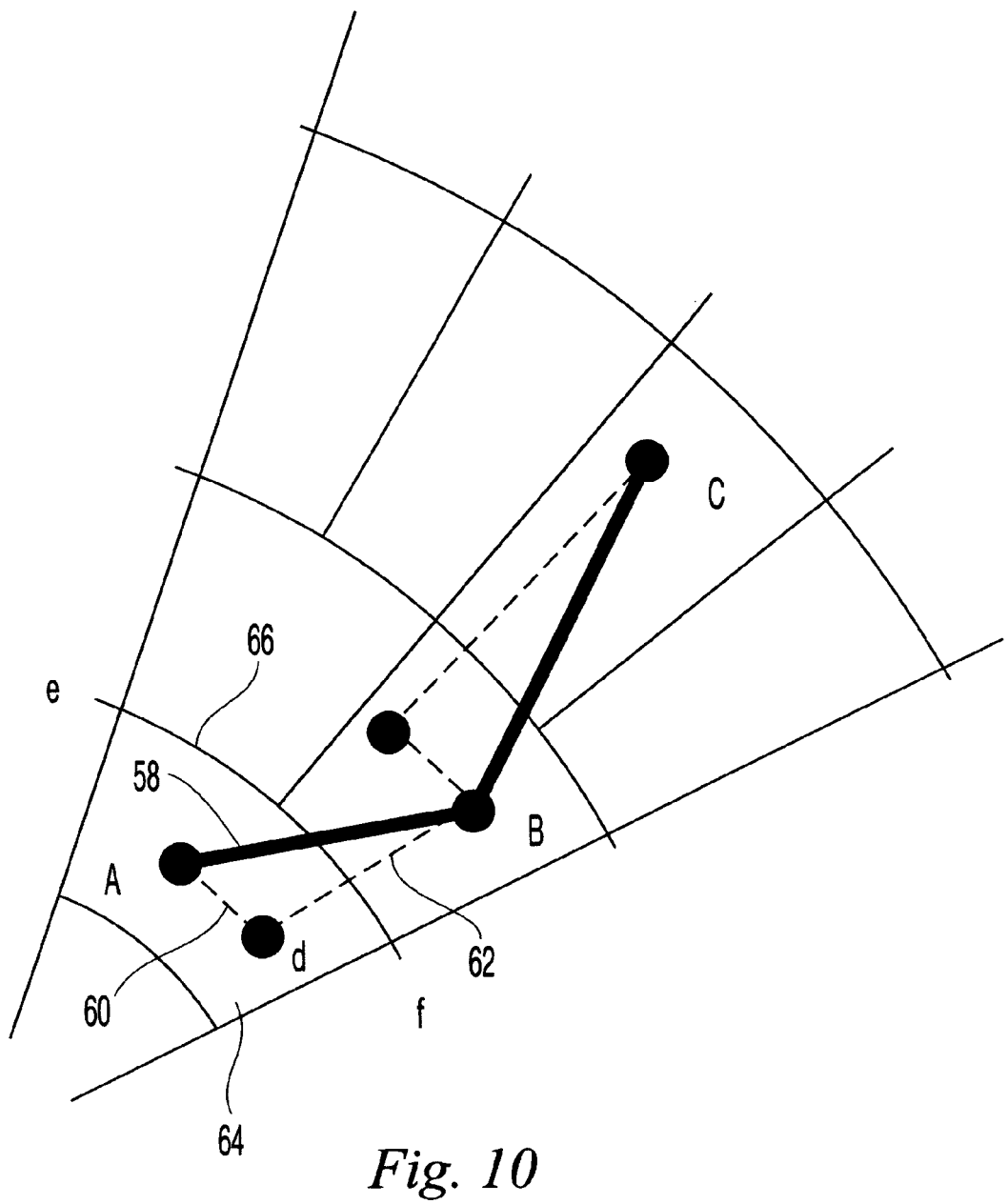
FIG. 10 is a schematic representation of the connection among nodes in sequential rings in accordance with the present invention.

Using the polar version of the triangle inequality, the length of the path can be bounded from above by computing the radius and arc components separately. The path which follows the cell boundaries is an upper bound. For example, in FIG. 10, the length of line AB 58 is less than the length of line Ad 60 added to line dB 62, and the arc containing Ad 64 can be upper-bounded by arc ef 66. The total length of all the ray segments (similar to dB 62) is at most 1 minus the radius of the disk. The max(R−q,q−r) component of $l_q$ can be included in this estimate as well, since we pick the least-radius point to be our cell representative.

Thus, $l_p \leq 1 + 2Ra + S_k$, where $S_k$ is the sum of arc lengths for inner (k−1) circles of the k-ring grid.

Let $\Delta_i$ be the length of an arc segment on circle i in the polar grid.

$$\Delta_i = 2\pi(1/((\sqrt{2})^{k-1}))(1/2^i) = 2\pi/(\sqrt{2})^{k-1}, 0 \leq i \leq k.$$

In the estimate of $S_k$, only the inner arcs were involve, i.e. arcs 1 through k−1. Hence, $S_k = \Sigma \Delta_i = (2\pi/(\sqrt{2})^{k-1})(1-1/(\sqrt{2})^{k-1})/(1-1/\sqrt{2})$, when summed from i=1 to i=k−1. Recalling that Ra in $l_p \leq 1 + 2Ra + S_k$ is an arc length as well, for some ring j, then $Ra \leq \Delta_j$. Therefore, $l_p \leq 1 + 2Ra + S_k$ can be rewritten as $l_p \leq 1 + 2Ra + S_k \leq 1 + 2\Delta_j + S_k$.

It can be shown that the right-hand side of this inequality approaches 1 from above as n approaches infinity. The precise argument state that both $\Delta_j$ and $S_k$ are infinitesimal as k goes to infinity. For any arbitrary small $\epsilon > 0$, there exists a K such that when k>K, the delay value corresponding to the solution $l_p$ is less than $1 + \epsilon/2$. Based on Corollary 1, for any arbitrary small $\delta > 0$, there exists an $N_1$, such that when $n > N_1$, the probability of having at least one node or point in each cell is larger than $1 - \delta/2$. It is also easy to show that there exists an $N_2$ such that when $n > N_2$, the probability of having a point in the ring between the circle of radius $1 - \epsilon/2$ and the unit circle is larger than $1 - \delta/2$. This implies the minimum radius is at least $1 - \epsilon/2$. Therefore, with probability at least $1 - \delta$, when n>max$\{N_1, N_2\}$ the minimum radius is at least $1 - \epsilon/2$. At the same time there is at least one point in each of the grid cells, which implies $lp < 1\epsilon/2$. Under this condition, the length of the longest path in this tree is within $\epsilon$ plus the value of the optimal solution, completing the proof for the asymptotic optimality of the polar grid algorithm. Therefore:

Theorem 2: For any small $\epsilon, \delta > 0$, there exists an N such that with probability greater than $1 - \delta$, when the number of nodes n is larger than N, the length of the longest path in the tree produced by the polar grid algorithm is within $\epsilon$ plus the optimal solution.

The asymptotic analysis and the constant factor approximation analysis are very similar. The only difference is that the contributions from the arcs need to be doubled. This is the case because now two links are used in each cell, instead of just one link. Since this contribution is infinitesimal for large n, the constant multiplier can be ignored, and the same proof can be used to show asymptotic optimality.

The algorithm can be adjusted to work in dimensions higher than two. Again, a polar grid is constructed which satisfies previously prescribed properties. The grid can be created similarly, in polar coordinates, by splitting the d-dimensional sphere into segments. The radius of each subsequent ring can equal the previous ring radius multiplied by $\sqrt[d]{2}$ (so it has twice the volume). Each cell is split into two along a splitting axis. The splitting axes are chosen to cycle through all the axes. Although the details of equal volume split become tedious, a similar proof can be constructed.

Proving asymptotic optimality for a circle (d-sphere), with the source in the center, implies asymptotic optimality in any convex region with arbitrary source placement inside the region. The algorithm constructs the smallest ring covering all points and centered at the source, and proceeds similarly as the circle case. The analysis is very similar. In this case, the lower bound on the longest path approaches the outer ring radius from below.

EXAMPLES

Experiments were run to illustrate the quality, running time and other properties of the heuristic algorithms in accordance with the present invention, for problems of different sizes. For each problem size, 200 random sets of points were generated uniformly distributed inside the unit disk or geometric region. The average maximum delay and other parameters of solution trees were computed. Both the out-degree 6 and out-degree 2 versions of the algorithm were tested. The results are listed in the table in FIG. 11. In addition, the performance of the three-dimensional version of the algorithm to connect points uniformly distributed inside a unit sphere was evaluated. The experiments were run on an Intel Pentium II 400 MHz computer with 128 megabytes of RAM.

All data obtained in the experiments on the unit disk are shown in the table 68. The first column 70 contains n, the number of nodes to be connected. The second column 72, labeled "Rings", is the average value of k, that is the number of rings for this problem size. Columns 3, and 8, designated 74 and 76 respectively and labeled "Core", contain the average core delay—the longest portion of the path between cell representative nodes. Columns 4 and 9, designated 78 and 80 respectively and labeled "Delay", show the average longest delay observed in the solution tree. Columns 5 and 10, designated 82 and 84 respectively and labeled "Dev", display the standard deviation of the longest delay. The lower bound on the delay is close to 1, so the closer delay is to 1, the better. "Bound" columns, designated 86 and 88, show the value of the upper bound given by the equation $l_p \leq 1 + 2Ra + S_k \leq 1 + 2\Delta_j + S_k$, evaluated at j=0. One reason to pick j=0 is because $\Delta_0 \geq \Delta_j$ for all j. In the formula for the upper bound, the coefficient of $\Delta_j$ can be doubled for out-degree 2 trees. Finally, the "CPU Sec" columns, designated 90 and 92, contain the computation times.

Figure 11:
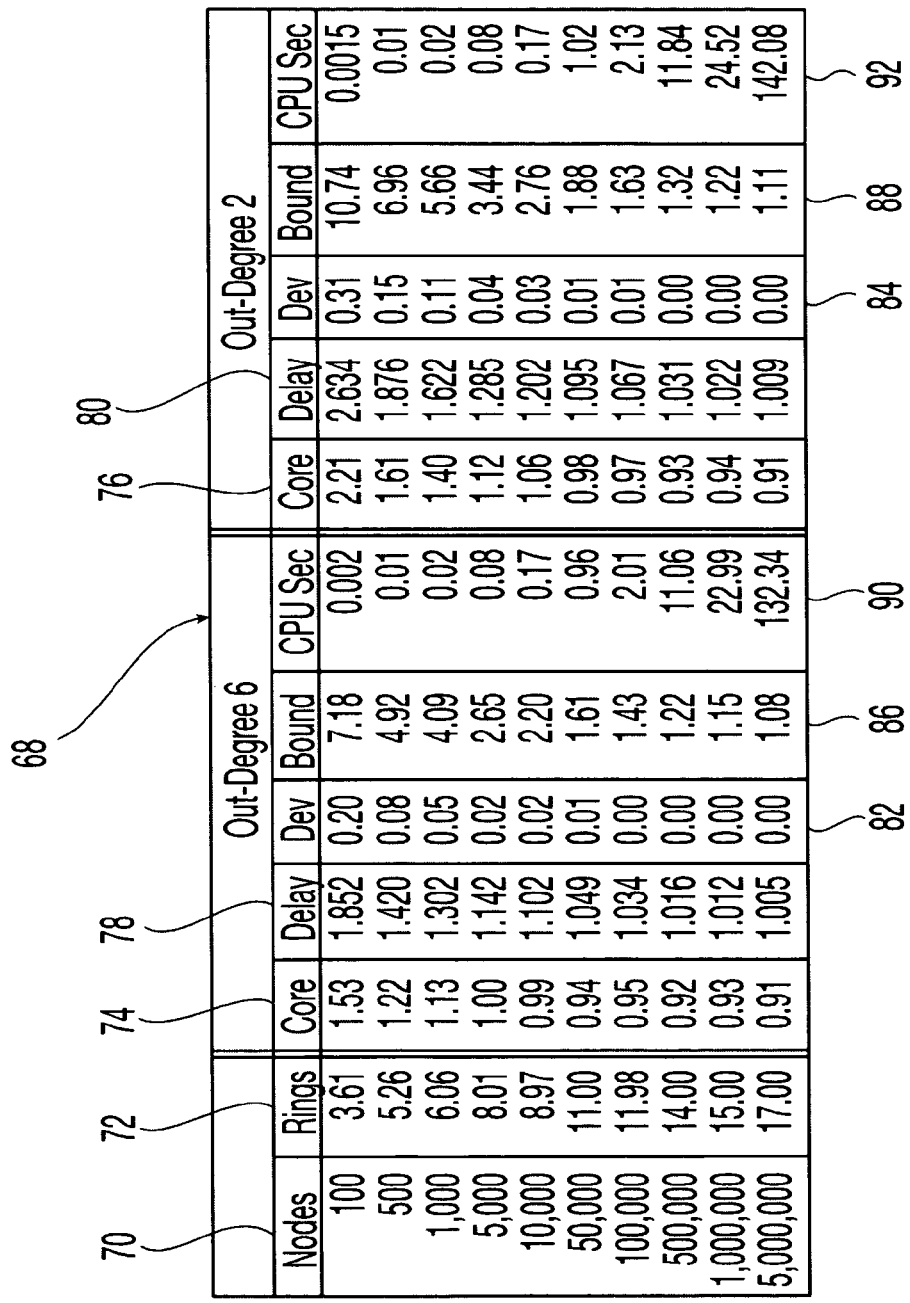
FIG. 11 is a table of experimental results of the delays in trees constructed in accordance with the present invention.
Figure 12:
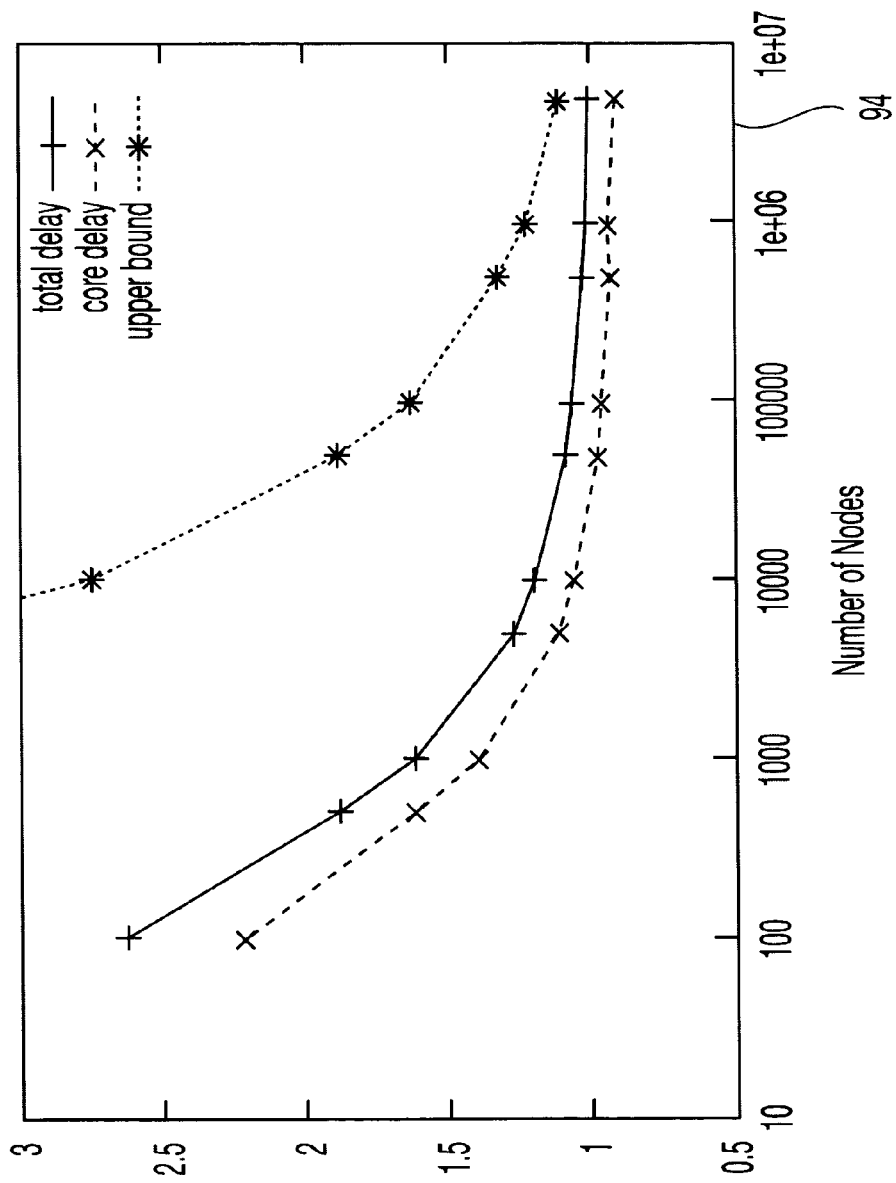
FIG. 12 is a graph of the average maximum delay compared to bounds for trees of out-degree 2.
Figure 13:
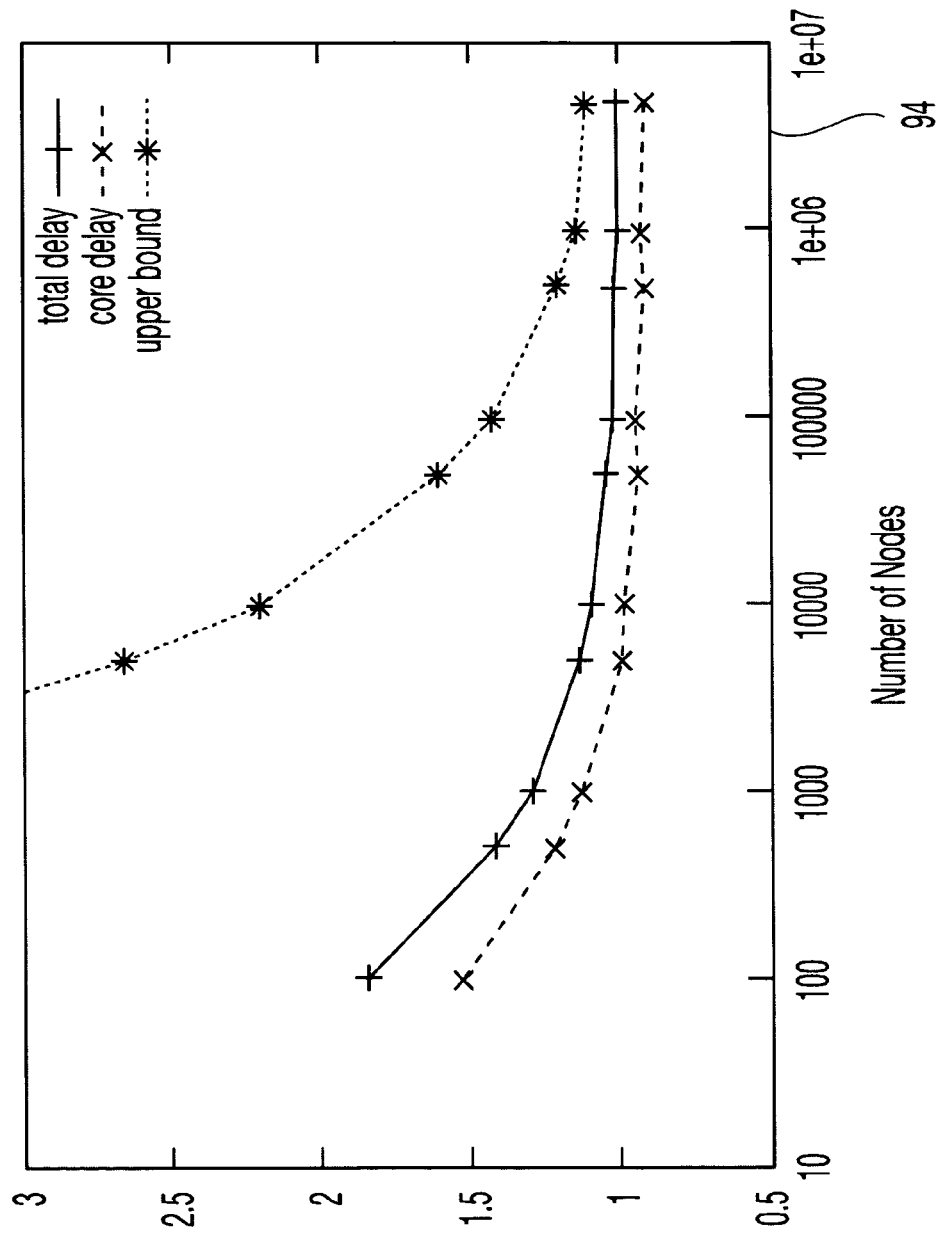
FIG. 13 is a graph of the average maximum delay compared to bounds for trees of out-degree 6.

To illustrate our results, a set of plots are included based on data shown in the table in FIG. 11. The results demonstrate that the algorithm converges very quickly. FIGS. 12 and 13 show the maximum sender-to-receiver delay together with the delay bound and the core delay for trees having out-degrees of 2 and 6 respectively. The horizontal axis 94 represents the number of nodes in logarithmic scale. This is also the case for FIG. 14, a comparison of the average minimum delay for out-degrees 2 and 6, and FIG. 15, showing the average number of rings in the polar grid. The bound used in the analysis of the algorithms significantly over-estimates the delay for problems with a small number of nodes. The bound becomes better and better as the number of nodes increases. The. difference between the core and the total delay does not diminish. This is because the difference depends on the radius of the outermost ring, which remains constant as the number of nodes increases.

Figure 14:
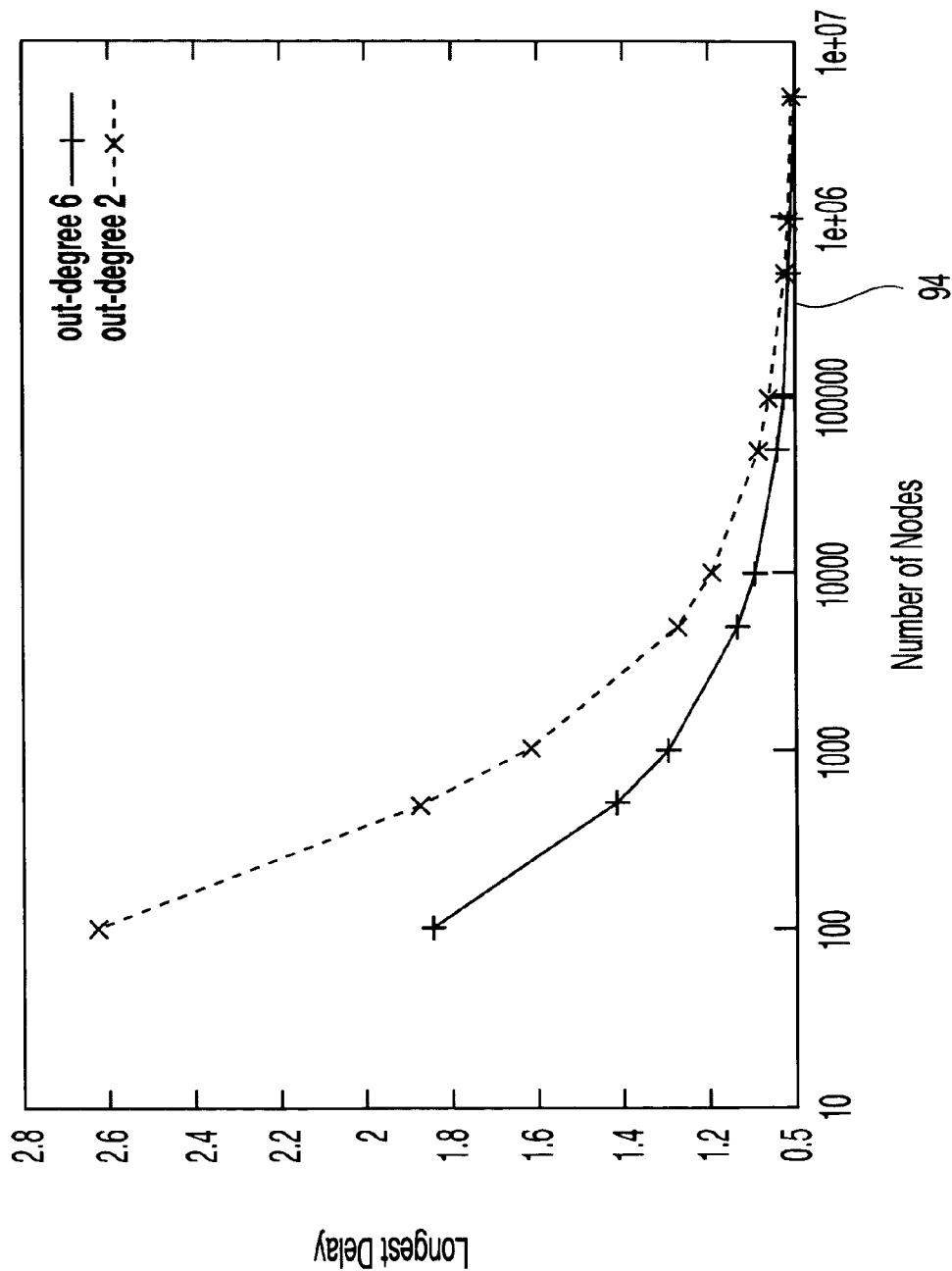
FIG. 14 is a graph of the comparison of the average maximum delay for out-degrees 2 and 6.
Figure 15:
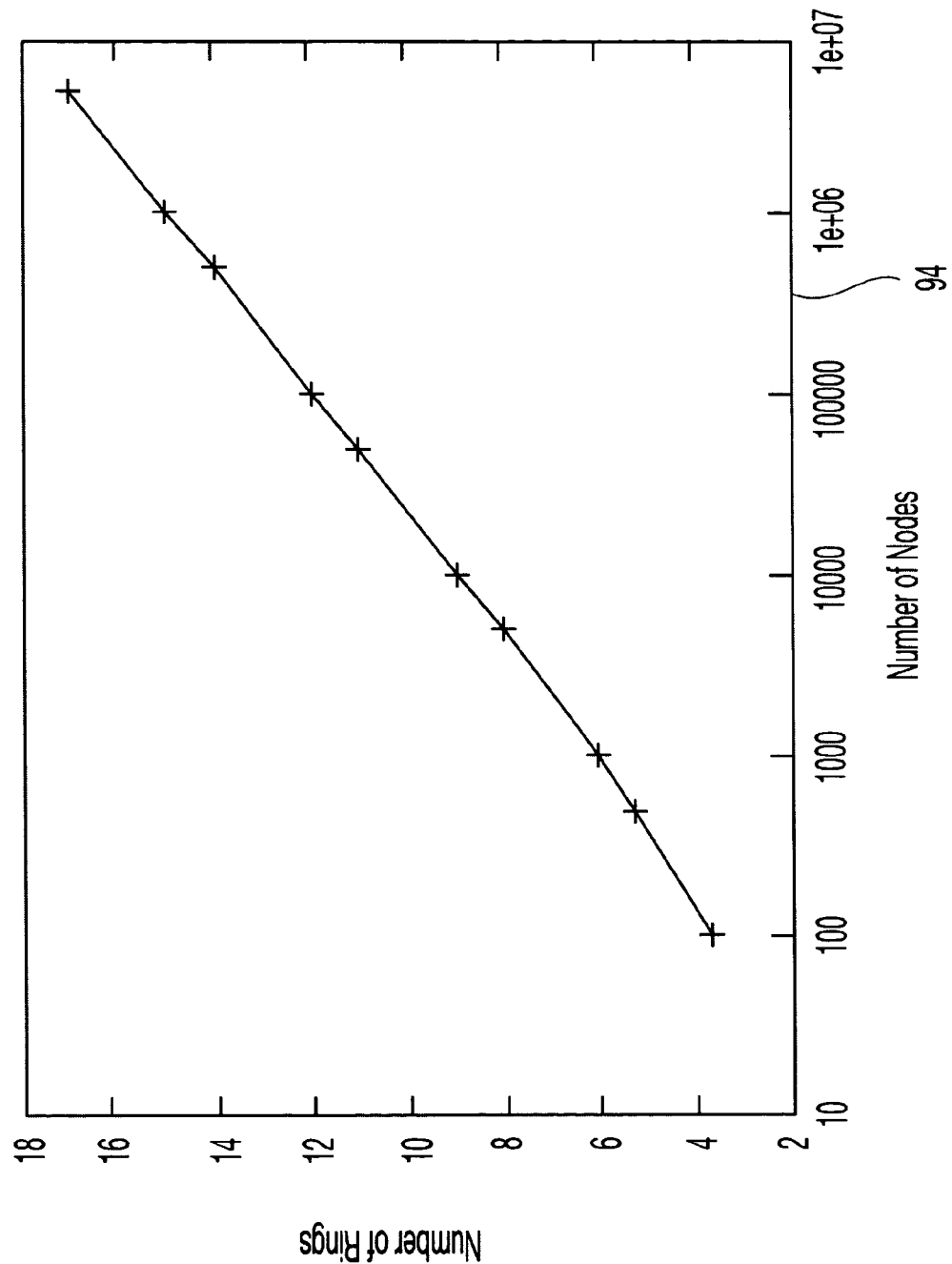
FIG. 15 is a graph of the average number of rings in a polar gird for a given number of nodes.

FIG. 14 combines the plots on FIGS. 12 and 13 and compares the maximum delay for degree 2 and degree 6. The delay overhead of degree 2 trees is almost 2 times the overhead of degree 6 trees. This is intuitive, since there is the same relationship between the bounds on the lengths of the paths. As the number of nodes increases, the degree of each particular node becomes less and less important, and the two curves all converge to the best possible delay of one.

FIG. 15 shows how the number of rings, k, in the grid created by the algorithm changes with the number of nodes, n. The node axis 94 is again in logarithmic scale. The points follow almost a straight line. This indicates that there is a logarithmic dependence, which is implied by the equation $k \geq \frac{1}{2} \log_2 n$.

Figure 16:
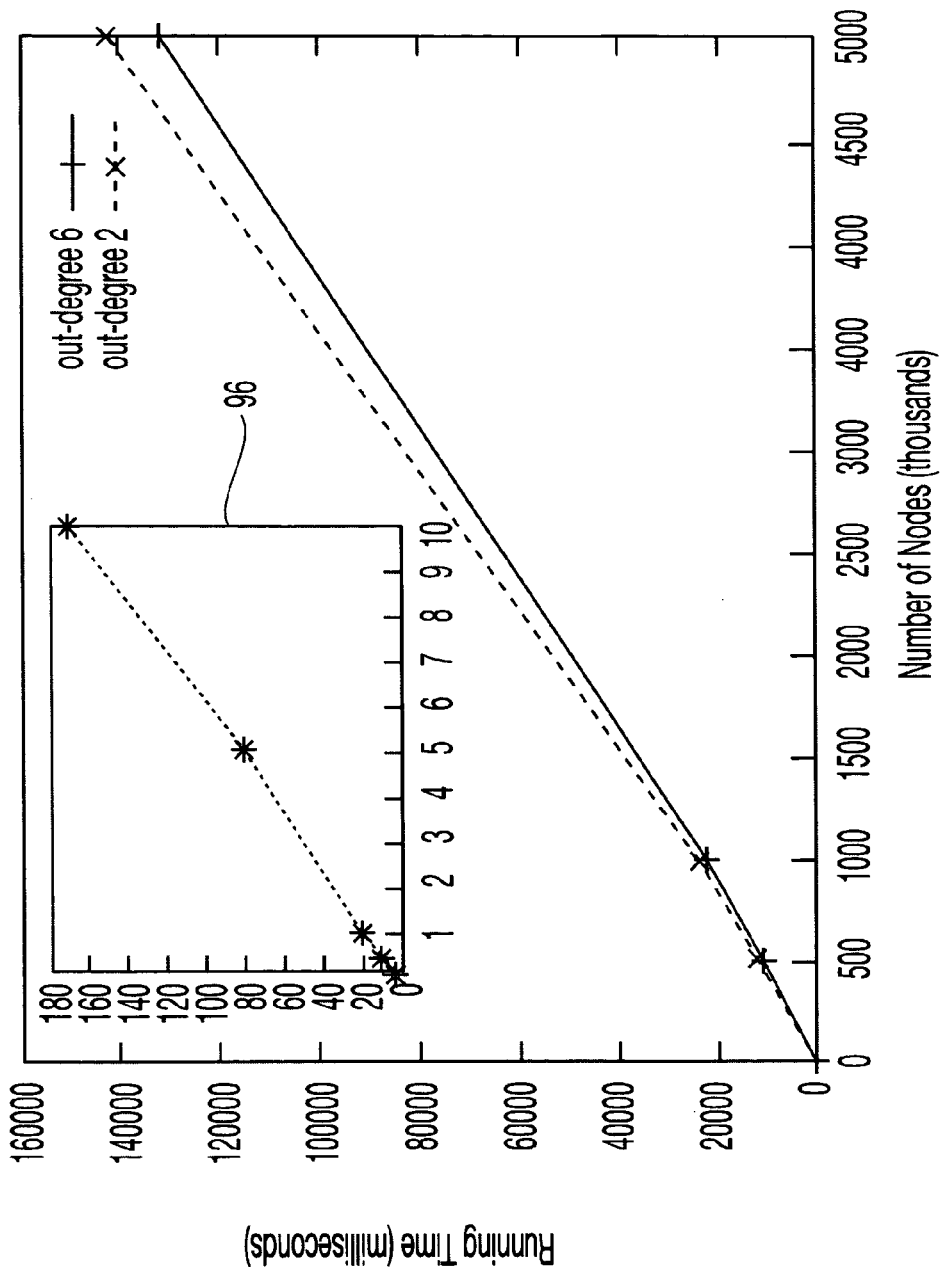
FIG. 16 is a graph of the algorithm running time in accordance with the present invention for a given number of nodes.

FIG. 16 shows how the running time of the program increases with the number of nodes. The small insert plot 96 shows the details for problems with nodes between 100 and 10,000. The plot allows evaluation of the general trend of the algorithm complexity. Running time increases almost linearly, which makes it possible to run the algorithm for networks with very large sizes. The straightforward implementation of the algorithm can probably be fine tuned and improved. Furthermore, in practice, the running time will depend on the hardware and software environment used.

In fact, during the assignment of points to the grid cells, the algorithm inspects each point only once, which requires $O(n)$ operations. Then, the bisection algorithm divides ring segments and enumerates all the points within each segment. Given m points, the bisection algorithm will create at most m non-empty segments. In the worst case, the number of operations at this stage can be estimated as $O(m^2)$, since each point may be inspected during the processing of each segment. Since the distribution of points is uniform, the total running time of the algorithm is linear in n with high probability. This can be intuitively explained by the following argument. Since points are distributed uniformly between cells, the average number of points in each cell is $n/2^k$. The experiments confirm that the relationship between k and n stated in the equation $k \geq \frac{1}{2} \log_2 n$ holds, i.e., k is a logarithmic function of n (FIG. 15). Because of this relationship, the number of points per cell remains constant on average, independent of n. Therefore, the running time of bisection in each cell is also roughly constant. Since we require at least one point to be contained in each cell, the total number of cells is at most $O(n)$. Therefore, the total number of calls to the bisection procedure is at most $O(n)$, leading to an overall number of operations which is $O(n)$.

Figure 17:
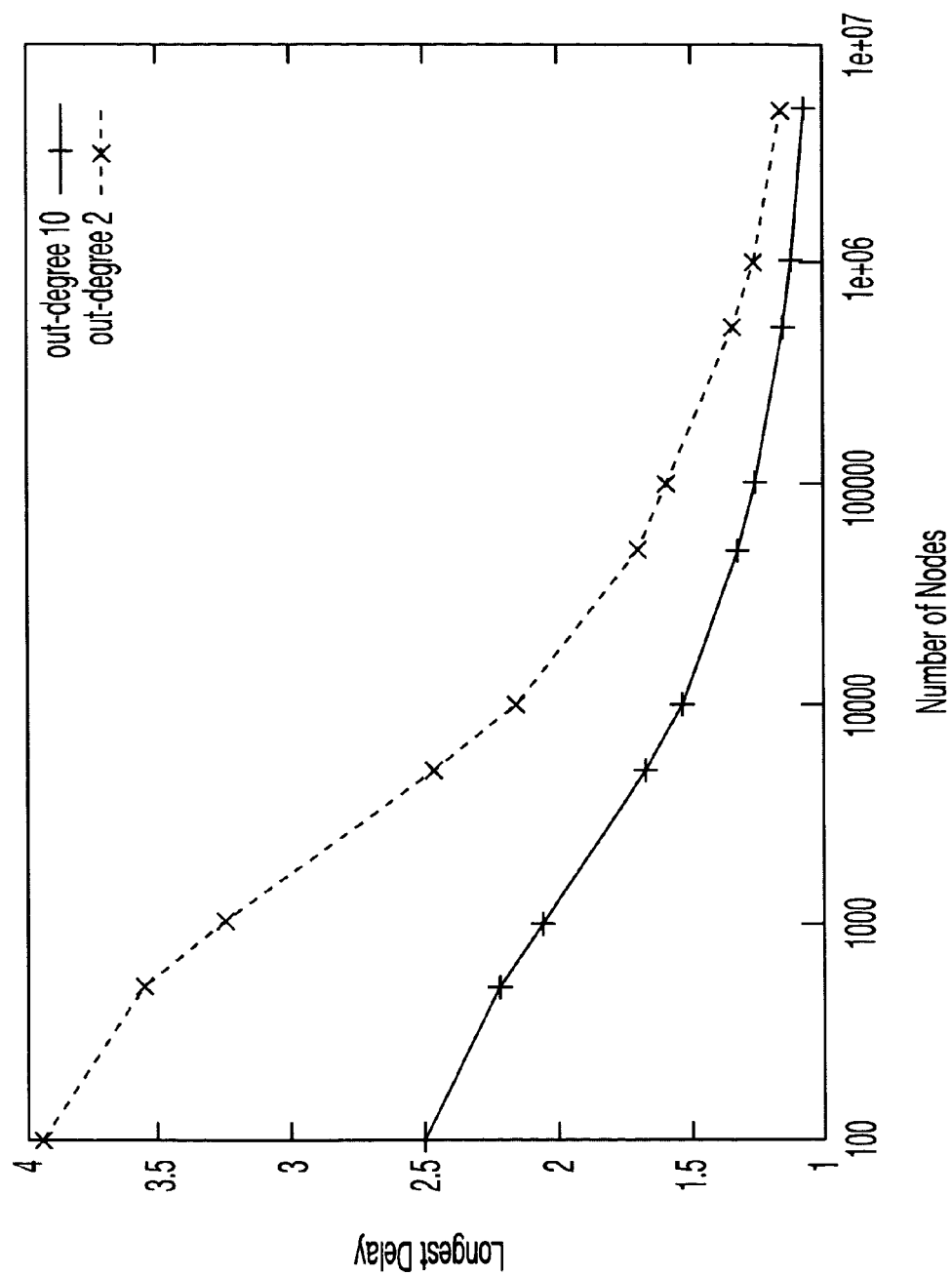
FIG. 17 is a graph of the average maximum delay in a three-dimensional unit sphere for a given number of nodes.

Finally, in FIG. 17, algorithm convergence results in the three-dimensional unit sphere are demonstrated. Similar to the unit disk case, 200 experiments were run for each problem size, and the average longest path was computed. For three dimensions, the straightforward extension of the algorithm builds a tree of out-degree 10. In the bisection algorithm, each cell representative node uses 2 links to connect to cells in the next ring and uses at most 8 links to connect to points inside the cell. As in two dimensions, the algorithm is modified to construct trees of out-degree no more than 2. In both cases, the longest path length converges to the lower bound of 1.

Similar to the longest path results on a unit disk, as illustrated in FIG. 14, the difference in three dimensions between out-degree 2 and out-degree 10 trees becomes less noticeable as the number of nodes increases. Although the asymptotic optimality holds in general multi-dimensional Euclidean space, FIG. 17 shows that the largest delay in 3 dimensions is higher than in 2 dimensions, for problems with the same number of nodes. This can be explained by the increase in the average distance between uniformly distributed points, as the dimensionality of the unit sphere increases and number of points remains constant.

The present invention is also directed to a computer readable medium containing a computer executable code that when read by a computer causes the computer to perform a method for constructing an overlay multicast tree to deliver data from a source to an identified group of nodes in accordance with the present invention. The medium and code can be contained at the source 10 or one or more of the nodes 12.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). For example, methods and apparatus in accordance with the present invention can be used as a routing method in any communication system and can be used to solve routing and layout problems in very large scale integration (VLSI) circuit design. Therefore, it will be understood that the appended claims are intended to cover all such modifications and embodiments, which would come within the spirit and scope of the present invention.

What is claimed is:

1. A method for constructing an overlay multicast tree to deliver data from a source to an identified group of nodes, the method comprising:
   identifying a plurality of nodes;
   mapping the nodes into multidimensional space;
   constructing a circular geometric region comprising a size that is the minimum size necessary to contain the source and all the nodes;
   creating a polar grid within the geometric region comprising a plurality of cells such that all of the cells comprise an equivalent amount of area;
   dividing the circular geometric region into a maximum number of rings such that there is at least one node in each cell except for cells disposed in an outmost ring;
   creating a tree beginning at the source and including all of the nodes within the geometric region; and
   using the created tree as the overlay multicast tree to deliver data from the source comprising a provider of a given service to an identified group of nodes comprising subscribers having access to the given service.

2. The method of claim 1, wherein the step of mapping the nodes into multidimensional space comprises mapping the nodes into multidimensional Euclidean space.

3. The method of claim 1 wherein the step of creating a tree comprises selecting a representative node for each cell containing at least one node and connecting first to the representative nodes.

4. The method of claim 3, wherein the representative node is selected to be the node within each cell that is closest to the source.

5. The method of clam 4, further comprising, for cells containing two nodes one of which is the representative node, connecting the representative node to a second node in the same cell and using the second node to connect to the representative nodes in at least two cells in an outer ring.

6. The method of claim 4, further comprising, for cells containing three or more nodes one of which is the representative node, selecting a second node in the same cell to connect to additional nodes in the cell and selecting a third node in the cell to connect to the representative nodes in at least two cells in an outer ring.

7. The method of claim 3, further comprising connecting additional nodes within each cell.

8. The method of claim 7, wherein the step of connecting to additional nodes within each cell comprises using a constant factor approximation algorithm.

9. The method of claim 1, wherein the step of constructing a polar grid comprises dividing the circle into a plurality of rings by constructing a sequence of circles of decreasing radius concentric with the source such that each subsequent circle divides in half an area bounded by a next largest circle, and placing a number of the cells into each one of the plurality of rings such that the number of cells per ring doubles with each ring moving radially outward from the source.

10. The method of claim 1, wherein the step of creating a tree comprises using an out-degree less than two for each node in the tree.

11. A computer readable medium containing a computer executable code that when read by a computer causes the computer to perform a method for constructing an overlay multicast tree to deliver data from a source to an identified group of nodes, the method comprising:
identifying a plurality of nodes;
mapping the nodes into multidimensional space;
constructing a circular geometric region comprising a size that is the minimum size necessary to contain the source and all the nodes;
creating a polar grid within the geometric region comprising a plurality of cells such that all of the cells comprise an equivalent amount of area;
dividing the circular geometric region into a maximum number of rings such that there is at least one node in each cell except for cells disposed in an outmost ring; and
creating a tree beginning at the source and including all of the nodes within the geometric region.

12. The computer readable medium of claim 11, wherein the step of mapping the nodes into multidimensional space comprises mapping the nodes into multidimensional Euclidean space.

13. The computer readable medium of claim 11, wherein the step of creating a tree comprises selecting a representative node for each cell containing at least one node and connecting first to the representative nodes.

14. The computer readable medium of claim 13, wherein the representative node is selected to be the node within each cell that is closest to the source.

15. The computer readable medium of claim 14, further comprising, for cells containing two nodes one of which is the representative node, connecting the representative node to a second node in the same cell and using the second node to connect to the representative nodes in at least two cells in an outer ring.

16. The computer readable medium of claim 14, further comprising, for cells containing three or more nodes one of which is the representative node, selecting a second node in the same cell to connect to additional nodes in the cell and selecting a third node in the cell to connect to the representative nodes in at least two cells in an outer ring.

17. The computer readable medium of claim 13, further comprising connecting additional nodes within each cell.

18. The computer readable medium of claim 17, wherein the step of connecting to additional nodes within each cell comprises using a constant factor approximation algorithm.

19. The computer readable medium of claim 11, wherein the step of constructing a polar grid comprises dividing the circle into a plurality of rings by constructing a sequence of circles of decreasing radius concentric with the source such that each subsequent circle divides in half an area bounded by a next largest circle, and placing a number of the cells into each one of the plurality of rings such that the number of cells per ring doubles with each ring moving radially outward from the source.

20. The computer readable medium of claim 11, wherein the step of creating a tree comprises using an out-degree less than two for each node in the tree.

* * * * *

UNITED STATES PATENT AND TRADEMARK OFFICE
CERTIFICATE OF CORRECTION

PATENT NO. : 7,593,353 B2  Page 1 of 1
APPLICATION NO. : 10/800305
DATED : September 22, 2009
INVENTOR(S) : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1559 days.

Signed and Sealed this

Twenty-first Day of September, 2010

David J. Kappos
*Director of the United States Patent and Trademark Office*